United States Patent
Cox et al.

(10) Patent No.: US 7,770,924 B2
(45) Date of Patent: Aug. 10, 2010

(54) LIQUID COOLED HYBRID

(75) Inventors: Matthew A. Cox, Centerville, UT (US);
Bradley W. Smith, Plain City, UT (US);
David W. Parkinson, Ogden, UT (US);
Brent A. Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/218,664

(22) Filed: Jul. 17, 2008

(65) Prior Publication Data
US 2010/0013201 A1 Jan. 21, 2010

(51) Int. Cl.
*B60R 21/264* (2006.01)
(52) U.S. Cl. .................. 280/741; 280/737; 102/530
(58) Field of Classification Search ............. 280/741, 280/736, 737; 102/530, 531
See application file for complete search history.

(56) References Cited

U.S. PATENT DOCUMENTS

| 3,810,655 | A | 5/1974 | Pracher |
| 3,813,007 | A | 5/1974 | Doin et al. |
| 5,669,631 | A | 9/1997 | Johnson et al. |
| 6,076,468 | A | 6/2000 | DiGiacomo et al. |
| 6,196,583 | B1 * | 3/2001 | Ruckdeschel et al. ....... 280/736 |
| 6,412,814 | B1 | 7/2002 | Huber et al. |
| 6,481,357 | B1 * | 11/2002 | Lindner et al. ............. 102/530 |
| 2002/0158454 | A1 | 10/2002 | Huber et al. |
| 2003/0137132 | A1 * | 7/2003 | Last et al. .................. 280/736 |

FOREIGN PATENT DOCUMENTS

DE 196 02 695 A1 7/1997

* cited by examiner

*Primary Examiner*—Ruth Ilan
*Assistant Examiner*—Keith Frisby
(74) *Attorney, Agent, or Firm*—Sally J Brown; Madson IP, P.C.

(57) ABSTRACT

An inflator that includes a quantity of gas generant housed within a chamber. A liquid and a piston are also housed within another chamber. This chamber is sealed by a burst disk. The piston includes an opening. During deployment of the inflator, the burst disk is ruptured and the piston moves towards the distal end of the inflator. The movement of the piston hydraulically expels the liquid through the opening in the piston such that the liquid cools and contacts the gas formed by combustion of the gas generant.

19 Claims, 7 Drawing Sheets

LIQUID COOLED HYBRID

BACKGROUND OF THE INVENTION

Airbags and airbag systems have been known and used for decades and have been credited with saving many lives and preventing many injuries. Airbag systems are used to deploy an airbag during a crash into a vehicle interior so that the vehicle occupant will impact the deployed airbag rather than the harder surface(s) of the vehicle interior.

Airbag systems generally include an inflator. An inflator is a device that is designed to produce and/or channel a quantity of inflation gas into the airbag during the deployment process. This influx of gas into the airbag inflates and deploys the airbag into the proper position. A variety of different inflators are known in the industry.

One type of known inflator is the so-called "pyrotechnic" inflator. Pyrotechnic inflators include a quantity of gas generant that is combusted to produce the inflation gas necessary to deploy the airbag. Accordingly, pyrotechnic inflators generally include the quantity of gas generant housed within a housing (i.e., a pressure vessel). Pyrotechnic inflators also generally include a filter. The filter is designed to filter the gas to remove solids entrained in the gas stream. The filter is also designed to cool the gas. However, the filter is often expensive and adds significant cost and weight to the inflator.

The automotive industry continues to demand airbag systems that are smaller, lighter, and less expensive to manufacture. In fact, as vehicles become smaller and more compact, such changes to the airbag systems are necessary in order to meet the constraints of these smaller cars. The airbag inflator is a significant component of the airbag system. Accordingly, reducing the size, weight, and/or cost of the inflator would result in significant size, weight, and/or cost savings in the overall airbag system.

Accordingly, the present embodiments relate to a new type of inflator that does not include a filter, but may still operate to cool the gas and/or remove entrapped particles from the gas stream. The removal of the filter from the airbag inflator makes this device smaller, lighter, and less expensive to manufacture.

BRIEF SUMMARY OF THE INVENTION

The inflator comprises a quantity of gas generant housed within a gas generant chamber. The gas generant chamber has a constant volume. The inflator also comprises an initiator to ignite the gas generant and form gas during deployment. A chamber is also provided to house a piston and a liquid, wherein the chamber is sealed by a burst disk or a seal, wherein during deployment the burst disk or seal is unsealed and the piston moves and hydraulically expels the liquid through an opening in the piston such that the liquid contacts and cools the gas formed by combustion of the gas generant. In some embodiments, the inflator may be fully or partially filterless. Other embodiments may be designed in which a diffuser is provided, the gas formed by combustion of the gas generant flows through the diffuser. In some embodiments, the burst disk will be ruptured whereas in other embodiments, the seal is press-fit against the chamber and this seal is unsealed by the movement of the piston.

In some embodiments, one or more baffles may be used. These baffles may be provided on the piston. In other embodiments, the gas formed by combustion of the gas generant and the liquid move into the interior of the piston, wherein an exit opening is provided to allow passage to the exterior of the piston. In some embodiments, the liquid hydraulically expelled through the opening vaporizes and mixes with the gas formed by combustion of the gas generant.

Additional embodiments may be constructed in which the gas formed by combustion of the gas generant flows through a tortuous path prior to exiting the inflator. This tortuous path may have right angle turn(s) for capturing particulates entrained in the gas. In further embodiments, as the gas flows through the tortuous path, any particulates entrained in the gas are removed from the gas and deposited within the inflator. The particulates may be deposited at a capture area.

A method of cooling gas formed in an inflator may also be disclosed. For this method, the inflator comprises a quantity of gas generant housed within a gas generant chamber, an initiator, and a piston chamber that houses a piston and a liquid. The method comprises the step of igniting the gas generant to form gas. An additional step of rupturing a burst disk used to seal the piston chamber is also performed. An additional step of moving the piston may also be performed. The movement of the piston operates to hydraulically expel the liquid through an opening in the piston such that the liquid contacts and cools the gas formed by combustion of the gas generant.

The present embodiments relate to inflators that include a quantity of gas generant housed within a housing. The gas generant may be ignited to produce a quantity of inflation gas. This gas may then be channeled into an airbag to deploy the airbag. The inflator also includes gas flow openings in the housing. As will be explained herein, when the inflator is deployed, gas may flow out of the gas flow openings so that it may be channeled into the airbag.

The inflator will further comprise a piston that is housed within a chamber. (The chamber is within the housing). Also housed within the chamber is a quantity of liquid. The piston may also have an opening that is sealed by a burst disk. When the opening is sealed, the liquid cannot escape through the opening.

The combustion of the gas generant produces inflation gas that flows through the diffuser and contacts a piston that has been added to the inflator. This piston is housed within a chamber. When the gas enters this chamber, it pressurizes the chamber. At the same time, some of the gas may also begin to exit the inflator.

The chamber housing the piston also includes a quantity of liquid. When this chamber is pressurized by the influx of gas into the chamber, liquid begins to flow through an opening in the piston. This liquid will then mix with the gas.

When the liquid contacts the gas, at least some of the liquid is vaporized into a gas stream. Obviously, this vaporization process is endothermic and operates to cool the gas. Thus, by using a system that has evaporating liquid, the inflation gas may be cooled without the use of an expensive filter. Further, this vaporization of the liquid increases the amount of gas within the chamber. Thus, by using the liquid, the amount of gas generant necessary to produce sufficient inflation gas is reduced, further reducing the size and cost of the inflator.

Thus, by using the liquid injection technique described above, the present embodiments do not require the use of a filter to cool the gas. The pressure required to inject the liquid into the gas stream may be provided by the combustion pressure of the inflator. In other embodiments, the particulates in the gas produced by ignition of the gas generant may be removed without the use of a filter. Specifically, at least part of the particulate removal function of the filter is accomplished by turning the gas flow significantly prior to exiting the inflator. The gas produced by vaporization or decomposition of the liquid contributes to the airbag inflation.

It should also be noted that the present embodiments do not necessarily have to be filterless. A filter may also be used. However, the system may be "partially" filterless as the size and type of the filter needed may be reduced.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

Figure 1:
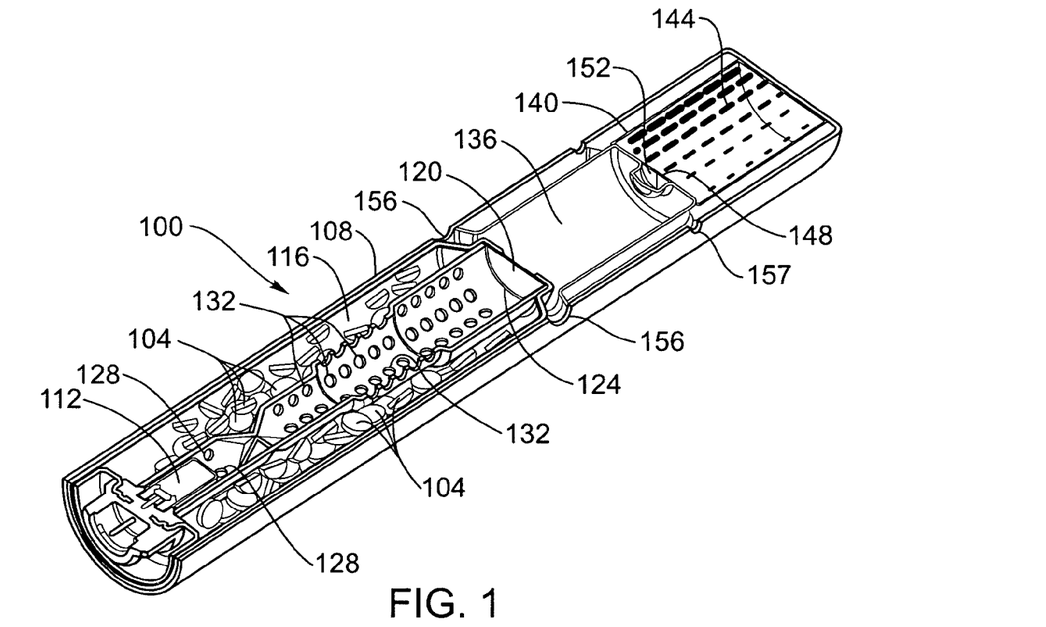
FIG. 1 is a sectional view of an embodiment of an inflator, the inflator being shown prior to deployment.

Referring now to FIG. 1, a sectional view of an inflator 100 is illustrated. The inflator includes a quantity of gas generant 104 housed within a housing 108. An initiator 112 is also added to the inflator 100. The initiator 112 is used to ignite the gas generant 104. When the gas generant 104 is ignited, a quantity of inflation gas is formed. This gas may then be channeled into an airbag (not shown) to deploy the airbag. Those skilled in the art will appreciate that initiators 112 and gas generant 104 are known in the art and that a variety of different features may be used for these components.

The generant 104 is housed within a chamber 116 that is sealed by a burst disk 120. The chamber 116 is sometimes referred to as a "gas generant chamber." The gas generant chamber 116 has a constant volume. Before, during, and after deployment of the inflator, the volume of the gas generant chamber 116 remains the same. A diffuser 124 is also positioned in the chamber 116. Specifically, when the initiator 112 is activated, it will produce hot gas that will flow through holes 128. This hot gas will then contact the generant 104 and ignite the generant 104. In turn, this ignition of the generant 104 creates a supply of gas that will pass through the holes 132 to the interior of the diffuser 124 and will then contact the burst disk 120. The increase in pressure within the chamber 116 caused by ignition of the generant 104 will rupture the burst disk 120 and allow the gas to exit the chamber 116.

Referring still to FIG. 1, the inflator 100 will further comprise a piston 136 that is housed within a chamber 140. (The chamber 140 is within the housing 108). Also housed within the chamber 140 is a quantity of liquid 144. The piston 136 may also have an opening 148 that is sealed by a burst disk 152. When the opening 148 is sealed, the liquid 144 cannot escape through the opening 148.

The liquid 144 may be any liquid that remains a liquid between −35 degrees Celsius and 85 degrees Celsius. The liquid must also be capable of vaporizing endothermically and, when vaporized, produce a gas that is within acceptable effluent limits associated with airbags. Also, the liquid may be non-corrosive so that it may be stored in a simple chamber. Any liquid that will meet these criteria may be used as the liquid 144. An example of a liquid that meets such criteria includes water mixed with $CaCl_2$.

The inflator 100 of FIG. 1 also includes gas flow openings 156 and vent holes 157 in the housing 108. As will be explained herein, when the inflator 100 is deployed, gas may flow out of the gas flow openings 156 so that it may be channeled into the airbag (not shown). The gas flow openings 156 may or may not be sealed by burst disks prior to deployment.

Figure 2:
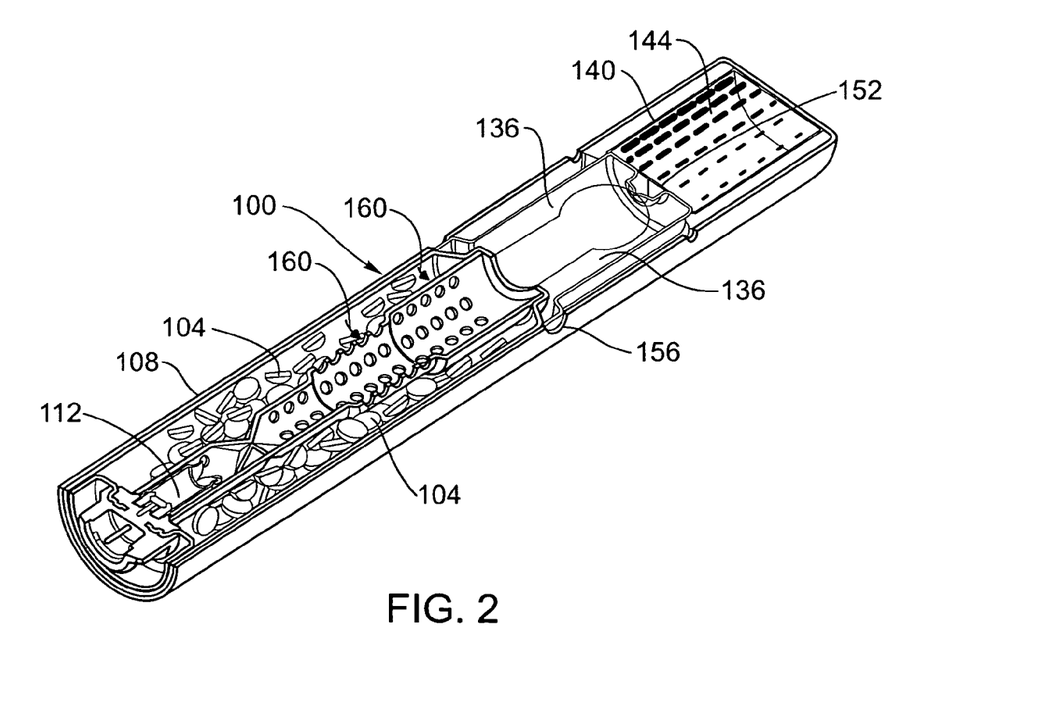
FIG. 2 is a sectional view of the embodiment of FIG. 1, the inflator being shown as the initiator is being actuated and the burst disk ruptures.

As noted above, FIG. 1 shows the inflator 100 prior to deployment. With reference to FIGS. 1 through 6, the deployment of the inflator 100 will now be described. FIG. 2 is a sectional view of the embodiment of FIG. 1 which shows actuation of the initiator 112. When the initiator 112 is actuated, hot gas will be produced and allowed to pass through the holes 128, thereby contacting the gas generant 104. Such contact with the gas generant 104 ignites and combusts the gas generant 104 into a quantity of inflation gas.

Figure 3:
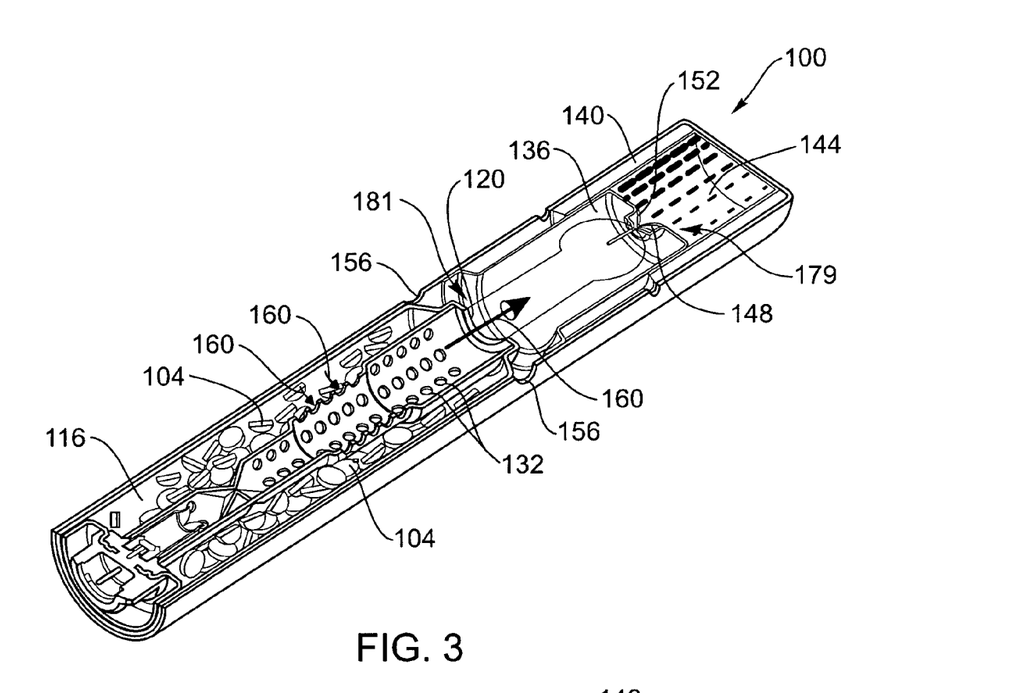
FIG. 3 is a sectional view of the embodiment of FIG. 1, the inflator being shown as the liquid injection is occurring.

FIG. 3 shows the inflator 100 as the gas generant 104 is combusted. As explained above, the combustion of the gas generant 104 produces inflation gas 160 (represented graphically by arrows) that flows through the holes 132 in the diffuser 124 and contacts the burst disk 120. The production of the gas 160 pressurizes the chamber 116 and causes the burst disk 120 to rupture. Once ruptured, the gas 160 will exit the chamber 116 and will enter the chamber 140.

When the gas 160 is in the chamber 140, it will contact the piston 136 and pressurize the interior of the chamber 140. Some of the gas 160 may also begin to exit the inflator 100 via the openings 156. However, the pressurizing of the chamber 140 will, in turn, cause the burst disk 152 (shown in FIG. 1) to rupture. Once ruptured, liquid 144 begins to be injected through the opening 148 (which is no longer sealed by the disk 152) and mix with the gas 160.

As shown in FIG. 3, the inflator 100 has an impact area 179 which is the area of the piston 136 that contacts the liquid 144. The inflator 100 also has a drive area 181, which is the area of the piston 136 that the gas 160 contacts. The impact area 179 is smaller than the drive area 181. The pressure of the liquid 144 is amplified due to the differences in areas 181 and 179. The liquid pressure is approximately equal to the pressure of the gas 160 times the ratio of the area 181 to area 179. This pressure differential causes the liquid 144 to inject into the inside region of the piston 136 and thereby interact with the gas 160.

Figure 4:
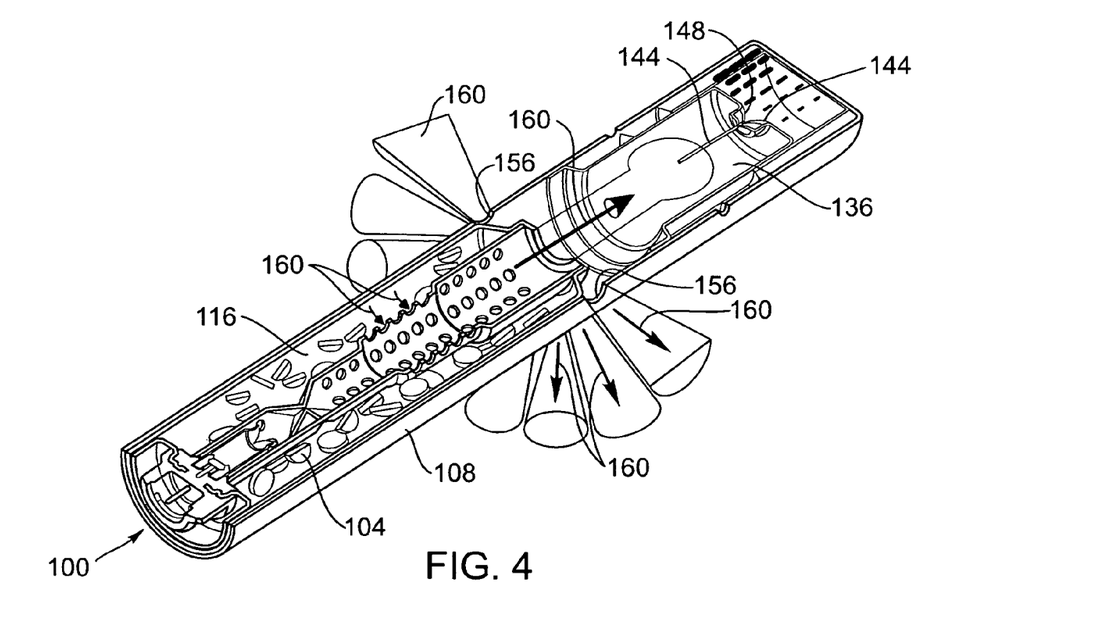
FIG. 4 is a sectional view of the embodiment of FIG. 1; the inflator being shown as the gas escapes the inflator.

FIG. 4 shows the deployment of the inflator 100 as the liquid 144 is being injected through the opening 148 and mixing with the gas 160. The pressure within the chamber 140 pushes against the piston 136 and causes the piston to move towards the liquid 144. This hydraulic pressure on the liquid 144 forces more of the liquid 144 through the opening 148. Of course, while this is occurring, gas 160 continues to enter the chamber 140 from the chamber 116. Some of the gas also continues to exit via the openings 156.

It should be noted that when the liquid 144 contacts the gas 160, at least some of the liquid 144 is vaporized into a gas stream. Obviously, this vaporization process operates to cool the gas 160. (Specifically, the heat required to vaporize or decompose the liquid 144 is removed from the gas stream and significantly cools the exiting gas 160). It should be noted that a filter is often used to cool the inflation gas. However, by using the liquid 144, the gas 160 may be cooled without the use of an expensive filter. Further, this vaporization of the liquid 144 increases the amount of gas within the chamber 140. Thus, by using the liquid 144, the amount of gas generant 104 necessary to produce sufficient inflation gas is reduced, further reducing the size and cost of the inflator 100.

Figure 5:
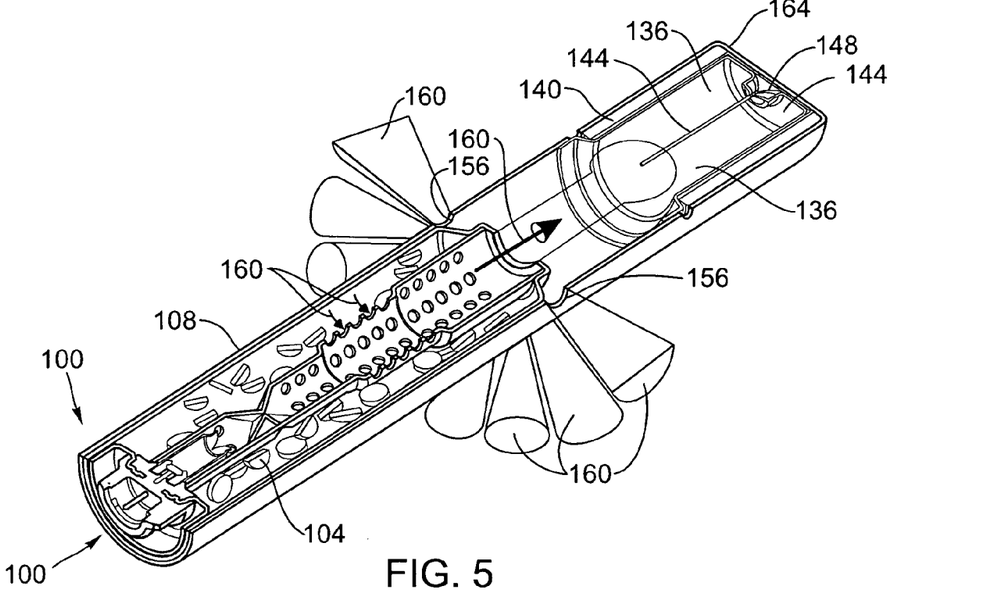
FIG. 5 is a sectional view of the embodiment of FIG. 1, the inflator being shown near the completion of the liquid injection.

FIG. 5 shows the inflator 100 after the piston 136 has completely moved. Specifically, the piston 136 is moved to the distal end 164 of the chamber 140, thereby forcing all of the liquid 144 to pass through the opening 148. Again, as noted above, this liquid 144 is vaporized into a gas. However, even after the liquid 144 has been fully injected, gas 160 is still exiting the inflator 100 via the openings 156.

Figure 6:
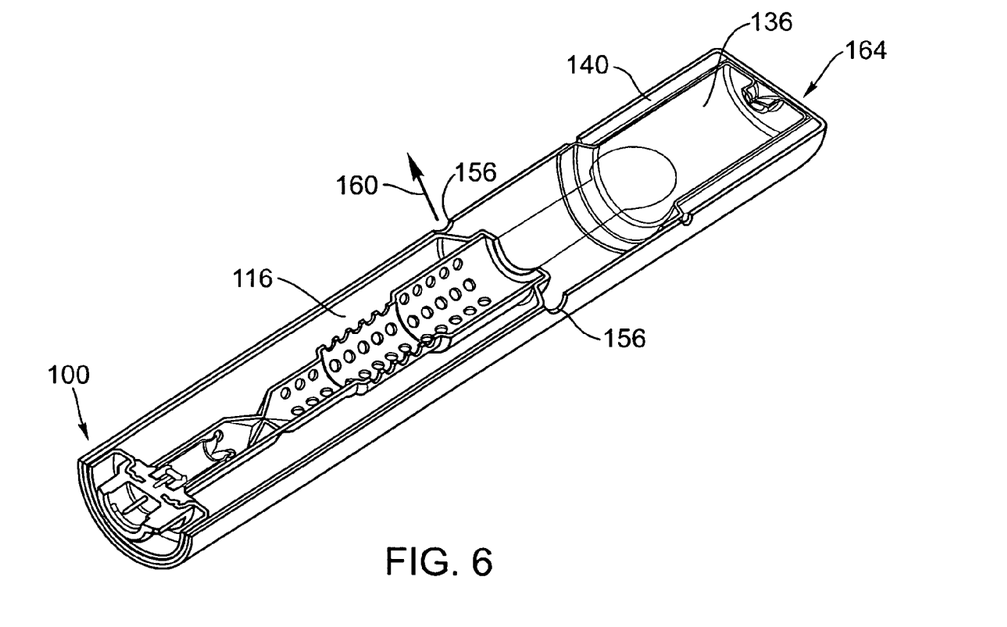
FIG. 6 is a sectional view of the embodiment of FIG. 1, the inflator being shown after the inflator has been fully deployed.

FIG. 6 shows the inflator 100 after the deployment process is complete. The liquid 144 has been fully converted into gas and has been emptied out of the chamber 140. The gas 160 produced by ignition of the gas generant 104 has also been fully discharged.

Figure 7:
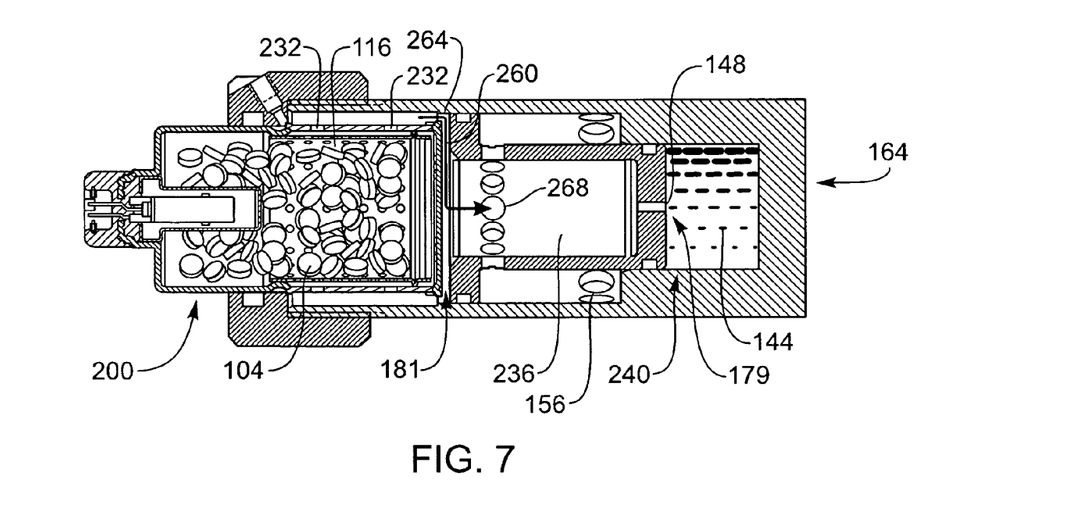
FIG. 7 is a sectional view of another embodiment of an inflator.

FIG. 7 is a sectional view of an additional embodiment of an inflator 200. The inflator 200 is similar to the embodiment of FIG. 1. For purposes of brevity, this discussion will not be repeated.

The main difference between the inflator 200 and the inflator 100 is that the inflator 200 does not include a diffuser 124. Rather, the inflator 200 simply has openings 232 that the gas 260 will pass through, after it has been formed from ignition of the gas generant 104. When the gas 260 passes through the openings 232, it will flow, as indicated by the arrows, through a tortuous path. More specifically, the gas 260 will flow past the corner 264 such that the gas flow path will bend. When the gas flow bends in this manner, the entrained particulates and other solids found within the gas 260 will be separated from the gas 260 and will be deposited proximate the corner 264. Thus, the entrained particulates are removed from the gas 260 flow without the use of an expensive filter or diffuser.

As shown in FIG. 7, a piston 236 is used in the inflator 200. The piston 236 is hollow and is within a chamber 240. Accordingly, the gas 260 leaving the chamber 116 will flow into the interior of the piston 236. The piston 236 includes exit openings 268 that will allow the gas to flow to the exterior of the piston 236 and then exit the inflator 200 via openings 156. The piston 236 also includes an opening 148 that may or may not be sealed by a burst disk 152. Again, the pressure caused by the gas will move the piston 236 towards the distal end 164 and will inject the liquid 144 through the opening 148. Once injected, the liquid 144 will vaporize and cool the gas 260 in the manner described above. During deployment of the inflator 200, the piston 236 may be fully displaced so that all of the liquid 144 may be fully forced through the opening 148.

As shown in FIG. 7, the inflator 200 has an impact area 179 which is the area of the piston 136 that contacts the liquid 144. The inflator 200 also has a drive area 181, which is the area of the piston 136 that the gas 160 contacts. The impact area 179 is smaller than the drive area 181.

Figure 8:
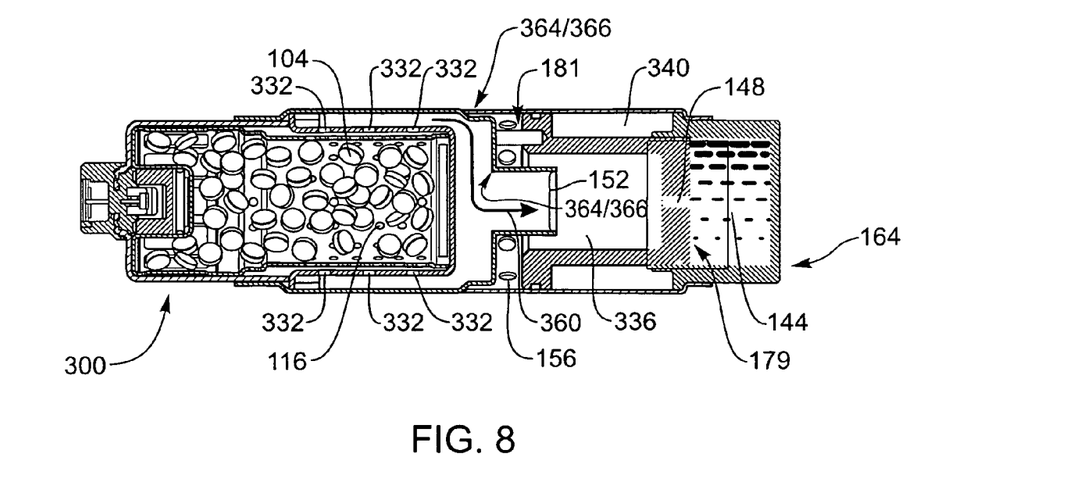
FIG. 8 is a sectional view of another embodiment of an inflator.

Referring now to FIG. 8, a sectional view of an inflator 300 is illustrated. The inflator 300 is similar to the embodiments discussed above. For purposes of brevity, this discussion will not be repeated.

Like the embodiment shown above, the inflator 300 does not include a diffuser. Rather, the embodiment of FIG. 8 includes openings 332 through which the gas 360 (produced by ignition of the generant 104) may exit the chamber 116. As with the embodiment discussed above, the gas 360, upon exiting the chamber 116, will engage in a tortuous path, passing two or more corners 364. Such corners 364 are right angle turns that will receive the entrained particulates. In other words, when the gas 360 turns at the corner 364, the entrained particulates will be separated out of the gas and deposited at a capture area 366. Generally, this capture area 366 is a corner or uneven surface that facilitates deposition. Thus, the entrained particulates are removed from the gas 360 without the use of an expensive filter or diffuser.

The inflator 300 also includes a piston 336. The piston 336 is hollow and is within a chamber 340. Accordingly, the gas 360 leaving the chamber 116 will flow into the interior of the piston 336. The inflator 300 also includes openings that will allow the gas to flow to the exterior of the piston 336 and then exit the inflator 300 via openings 156. The piston 336 also includes an opening 148 that may or may not be sealed by a burst disk 152. Again, the pressure caused by the gas will move the piston 336 towards the distal end 164 and will inject the liquid 144 through the opening 148. Once injected, the liquid 144 will vaporize and cool the gas 360 in the manner described above. During deployment of the inflator 300, the piston 336 may be fully displaced so that all of the liquid 144 may be fully forced through the opening 148. The inflator 300 has an impact area 179 and a drive area 181. The impact area 179 is smaller than the drive area 181.

Figure 9:
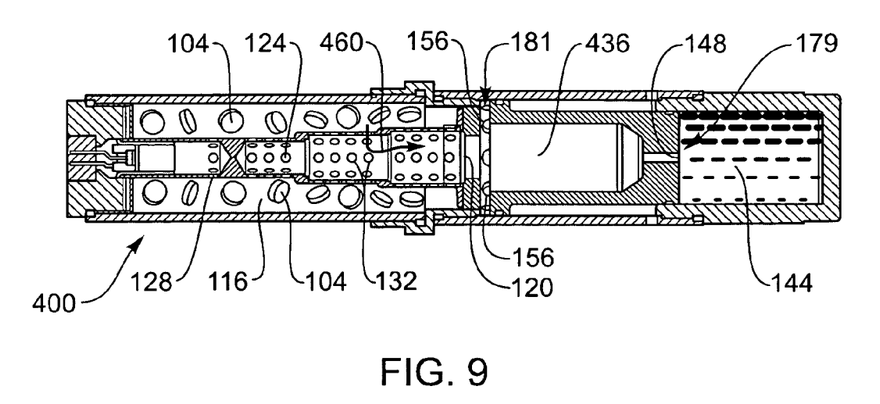
FIG. 9 is a sectional view of another embodiment of an inflator.

Referring now to FIG. 9, another embodiment of an inflator 400 is illustrated. The inflator 400 is similar to the embodiments discussed above. For purposes of brevity, this discussion will not be repeated.

As with the embodiment of FIG. 1, the inflator 400 includes a diffuser 124. As described above, gas 460 produced by the ignition of the generant 104 will flow through the holes 132 and rupture the burst disk 120 and then exit the chamber 116. Upon exiting the chamber 116, the gas will be allowed to exit the inflator 400 via the openings 156. The gas will also access the interior of the piston 436 and may move the piston 436, thereby forcing the liquid 144 through the opening 148 in the manner described above. The inflator 400 has an impact area 179 and a drive area 181. The impact area 179 is smaller than the drive area 181.

Figure 10:
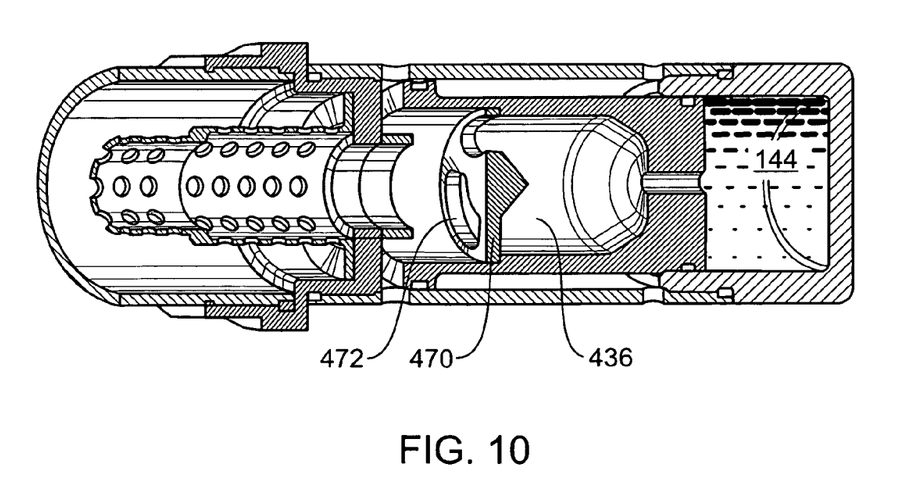
FIG. 10 is a sectional view showing a baffle that may be used as part of the embodiment of FIG. 9.

FIG. 10 is a cutaway view of the embodiment of FIG. 9. As shown in FIG. 10, the inflator 400 may further include one or more baffles 470 that operate to guide/direct the gas 460 and the injected liquid 144. Those skilled in the art will appreciate that other configurations and/or shapes for the baffles 470 are also possible. In fact, the baffles 470 may be shaped, as necessary, to adjust the gas flow. The baffles 470 may have additional openings 472. It should be noted that in some embodiments, the direction of the gas leaving the gas generant chamber 116 is directly opposite (or substantially opposite) to the direction of the liquid 144 being injected. As a result, these two streams can push against each other and hinder proper flow. In some instances, the entrained particulates may accumulate and clog the opening 148 (FIG. 9), thereby preventing the liquid 144 from cooling the gas 460. Accordingly, the baffles 470 may be added to direct the gas flow so that it is not flowing in a direction that frustrates or prevents the flow of the liquid 144.

Figure 11:
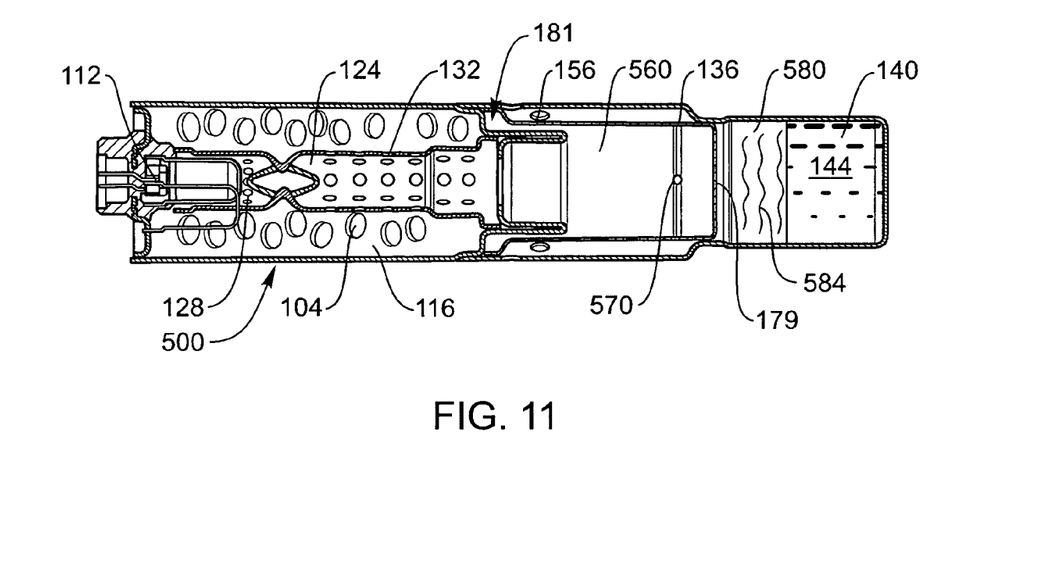
FIG. 11 is a sectional view of another embodiment of an inflator.
Figure 11A:
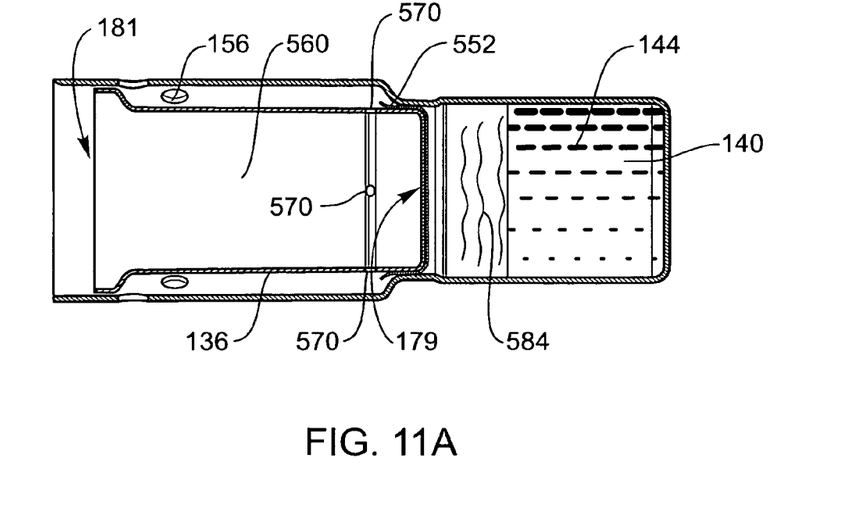
FIG. 11A is an enlarged version of the piston shown in FIG. 11.

FIG. 11 is a sectional view of another embodiment of an inflator 500 according to the present embodiments. FIG. 11A is an enlarged version of the piston portion of FIG. 11. Referring now to FIGS. 11 and 11A, the inflator 500 includes generant 104 housed within a chamber 116. As with the previous embodiments, an initiator 112 is capable of igniting the gas generant 104 into a quantity of inflation gas. A diffuser 124 is positioned within the chamber 116. The diffuser 124 includes holes 132 that will allow the gas produced by combustion of the generant 104 access to the interior of the diffuser 124 and can escape the chamber 116.

The inflator 500 will further comprise a piston 136. Adjacent the piston 136 is a chamber 140 that includes a liquid 144. As shown in FIG. 11A, the liquid 144 is sealed within the chamber 140 with a seal 552. This seal 552 may be a cup that is press fit around the piston 136 to seal the chamber 140. In other embodiments, the seal 552 may be a coating that is added to the piston 136 (or the chamber 140) to seal the chamber 140. Those skilled in the art will appreciate how to seal the chamber 140 via the seal 552. It should be noted that the inflator 500, unlike some of the prior embodiments, does not have a burst disk. Rather, this embodiment has a seal 552 that is used to seal the chamber 140.

Interior of the piston 136 is a mixing chamber 560. When gas produced by the combustion of the generant 104 exits the chamber 116, it may impact the piston 136 and fill the mixing chamber 560. As the piston 136 advances into chamber 140, the gas produced can exit the inflator via openings 156. The piston 136 has an impact area 179 and a drive area 181. The impact area 179 is smaller than the drive area 181.

Figure 12:
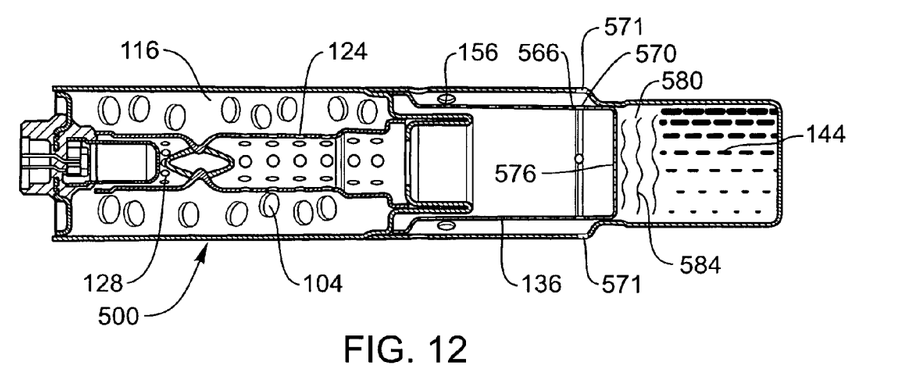
FIGS. 12 through 14 are sectional views that show the stages of deployment of the inflator of FIG. 11.
Figure 13:
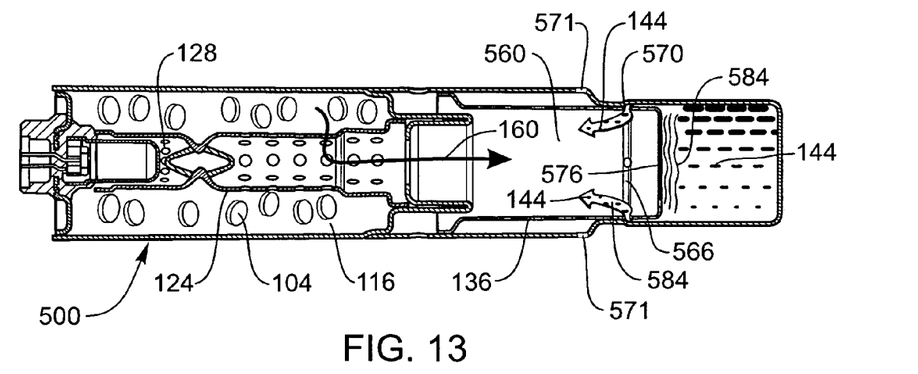
Figure 14:
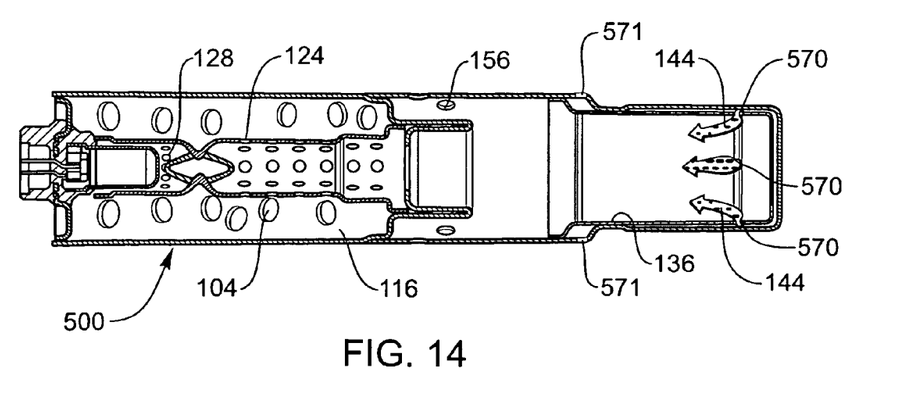

Referring now to FIGS. 12, 13, and 14, the stages of deployment of the inflator 500 are illustrated. When the generant 104 is combusted, a quantity of gas is produced. (This gas is illustrated by the arrow 160). This gas exits the chamber 116 via the diffuser 124 and may contact the piston 136. Some of this gas 160 may also begin to exit the inflator 500 via the openings 156. As the gas contacts the piston 136, the piston begins to move/displace towards the chamber 140. In turn, this displacement unseals the seal 552. For example, the press fit seal 552 is displaced such that it is no longer capable of sealing. (This may be that the piston 136 displaces past a press fit zone—i.e., an area that is press fit so that there is no longer a seal). In some embodiments, the piston 136 may have a depression 566 or other feature that, when moved towards the chamber 140, operates to ensure that there is a passage through which liquid 144 may flow. One or more vent holes 571 may also be added. These vent holes may operate to relieve pressure (such as "back pressure") in the device.

Once the seal 552 has been unsealed, liquid 144 will begin to flow out of the chamber 140. This liquid 144 may flow through openings 570 in the piston 136. Again, the movement of the piston 136 hydraulically expels the liquid 144 in the chamber 140 thereby causing the liquid 144 to inject through opening 570 for contact and mixing with the gas 160. (FIG. 13 shows the piston 136 as it is being moved, whereas FIG. 14 shows the piston 136 after it has been fully displaced and the liquid 144 has been fully expelled out of the chamber 140). The liquid 144 injected into the interior of the piston 136 is vaporized and used to inflate the airbag. However, the vaporization operates to cool the gas, as described herein. The gas 160 and the liquid 144 may mix in the mixing chamber 560. It should be noted that, in some embodiments, the gas 160 will push against the piston head 576 of piston 136 as a means of moving the piston 136. As the gas 160 pushes against this piston head 576, particulates and other undesirable byproducts can be deposited onto the piston head 576 and are thus separated from the quantity of gas 160.

Further, as noted above, the piston 136 may displace towards the chamber 140. In some embodiments, this movement of the piston 136 may be facilitated by not having the chamber 140 completely full with liquid 144. In other words, there is a space (sometimes called a "head space") within the chamber 140 into which the piston 136 may displace. In some embodiments, this head space 580 may be filled with a compressible gas 584 that allows the piston 136 to move into the chamber 140 during deployment. This compressible gas 584 may be air, argon, or any other suitable gas. This gas will escape out of the chamber 140 when it is unsealed and may further be used in the inflation process.

Referring now to all of the Figures generally, it will be appreciated that the present embodiments provide various advantages. For example, the present embodiments do not require the use of a filter to cool the gas. Rather, the cooling function is replaced by the injection of the liquid 144 into the gas stream during deployment. The particulate removal function of the filter is accomplished by turning the gas flow significantly prior to exiting the inflator. The gas produced by vaporization or decomposition of the liquid contributes to the airbag inflation. The pressure required to inject the liquid into the gas stream may be provided by the combustion pressure of the inflator. Further, in some embodiments, the rate of liquid injection may be proportional to the combustion pressure of the inflator, so the liquid may inject faster at hot temperatures (higher combustion pressures) and slower at cooler temperatures (lower combustion pressures).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator comprising:
   a quantity of gas generant housed within a gas generant chamber, the gas generant chamber having a constant volume;
   an initiator to ignite the gas generant and form gas during deployment;
   a chamber that houses a piston and a liquid, the piston having a hollow interior wherein the hollow interior of the piston is a mixing chamber sealed from the liquid, wherein during deployment the piston moves unsealing the mixing chamber from the liquid and hydraulically expelling the liquid through at least one opening in the piston such that the liquid contacts and cools the gas formed by combustion of the gas generant.

2. An inflator as in claim 1 wherein the gas formed by combustion of the gas generant and the liquid moving into the hollow interior of the piston passes through an exit opening to allow passage to the exterior of the piston.

3. An inflator as in claim 1 wherein the inflator is filterless.

4. An inflator as in claim 1 further comprising more than one opening, wherein at least one of the openings is off-set from the flow of the gas, thereby allowing the liquid to more readily be hydraulically expelled through the openings.

5. An inflator as in claim 1 wherein the liquid hydraulically expelled through the opening vaporizes and mixes with the gas formed by combustion of the gas generant.

6. An inflator as in claim 5 wherein the liquid is vaporized and mixes with the gas in a mixing chamber.

7. An inflator as in claim 1, wherein the gas formed by combustion of the gas generant flows through a tortuous path prior to exiting the inflator.

8. An inflator as in claim 7 wherein the tortuous path has a right angle turn for capturing particulates entrained in the gas.

9. An inflator as in claim 7 wherein as the gas flows through the tortuous path, at least some particulates entrained in the gas are removed from the gas and deposited within the inflator.

10. An inflator as in claim 9 wherein the particulates are deposited at a capture area.

11. An inflator as in claim 1 further comprising one or more baffles.

12. An inflator as in claim 1 wherein the liquid contains water.

13. An inflator as in claim 1 wherein the liquid is housed in a chamber and sealed by a seal, further comprising a quantity of gas that is positioned proximate the liquid.

14. An inflator as in claim 13 wherein the seal is press fit and the seal is unsealed by movement of the piston.

15. An inflator as in claim 1 wherein the interior of the piston is sealed by a burst disk.

16. An inflator as in claim 1 wherein an impact area of the piston that contacts the liquid is smaller than a drive area that contacts the gas, wherein the pressure of the liquid is amplified and causes injection of the liquid due to the differences between the impact area and the drive area.

17. An inflator as in claim 1, further comprising one or more vent holes that relieve pressure in the inflator.

18. An inflator comprising:
a quantity of gas generant housed within a gas generant chamber, the gas generant chamber having a constant volume;
an initiator to ignite the gas generant and form gas during deployment;
a chamber that houses a piston and a liquid, the piston having a hollow interior wherein the hollow interior of the piston is a mixing chamber sealed from the liquid, wherein during deployment the piston moves and unseals the mixing chamber from the liquid and the movement of the piston hydraulically expels the liquid through at least one opening in the piston such that the liquid contacts, vaporizes, mixes with, and cools the gas formed by combustion of the gas generant, wherein the gas flows through a tortuous path, at least some particulates entrained in the gas are removed from the gas and deposited within the inflator.

19. An inflator as in claim 18 wherein the tortuous path has a right angle turn for capturing particulates entrained in the gas.

* * * * *